US012657150B2

(12) United States Patent　　　　　　(10) Patent No.:　US 12,657,150 B2
Krishnamurthy et al.　　　　　　　　　(45) Date of Patent:　Jun. 16, 2026

(54) LOW-POWER FRAME TRANSMISSION OVER A COMMUNICATION INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/642,644

(22) Filed: Apr. 22, 2024

(65) Prior Publication Data

US 2025/0328484 A1　　　Oct. 23, 2025

(51) Int. Cl.
*G06F 13/14*　　　　　(2006.01)
*G06F 13/40*　　　　　(2006.01)

(52) U.S. Cl.
CPC ...... *G06F 13/4068* (2013.01); *G06F 2213/40* (2013.01)

(58) Field of Classification Search
CPC .......................... G06F 13/4068; G06F 2213/40
See application file for complete search history.

(56) References Cited

U.S. PATENT DOCUMENTS

| | | | | |
|---|---|---|---|---|
| 6,393,570 B1 * | 5/2002 | Henderson | .............. | G06F 1/324 |
| | | | | 713/323 |
| 9,575,543 B2 * | 2/2017 | Conrad | .................. | G06F 1/3243 |
| 2006/0077919 A1 * | 4/2006 | Gerkis | .................. | H04L 1/1887 |
| | | | | 370/315 |
| 2009/0282277 A1 * | 11/2009 | Sedarat | ................. | G06F 1/3228 |
| | | | | 713/320 |
| 2016/0261375 A1 * | 9/2016 | Roethig | .................. | H04L 7/041 |
| 2020/0278735 A1 * | 9/2020 | Ansari | .................. | G06F 1/3265 |

* cited by examiner

*Primary Examiner* — Henry Tsai
*Assistant Examiner* — Kim T Huynh
(74) *Attorney, Agent, or Firm* — Lowenstein Sandler LLP

(57)　　　　　ABSTRACT

A device includes receiver logic to receive frames over a link, datalink logic to the receiver logic, to process the frames, and control logic coupled to the receiver logic and the datalink logic. The control logic is to determine whether a first frame indicates that a first subsequent frame is a low-power frame type, for which the datalink logic consumes less power than a second frame type, and cause the datalink logic to process the first subsequent frame as the low-power frame type by enabling a clock gate for at least a portion of the datalink logic used to process the low-power frame type, responsive to determining the first frame indicates that the first subsequent frame is the low-power frame type.

21 Claims, 9 Drawing Sheets

200

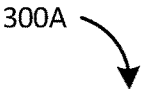

Client Frame 310

| | | |
|---|---|---|
| Flit 1 319A | Header Field 311 | Client Data 312A |
| Flit 2 319B | Client Data 312B | |
| . . . | • • • | |
| Flit N-1 319M | Client Data 312M | |
| Flit N 319N | Client Data 312N | Error Check Field 313 |

FIG. 3A

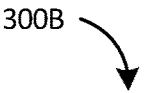

Non-Operational (NOP) Frame 320

| | | | |
|---|---|---|---|
| Flit 1 329A | Header Field 321 | NOP Data 322A | |
| Flit 2 329B | NOP Data 322B | | |
| . . . | • • • | | |
| Flit N-1 329M | NOP Data 322M | | |
| Flit N 329N | Next Frame Field 325 | NOP Data 322N | Error Check Field 323 |

FIG. 3B

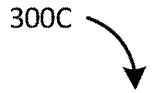

Low Power (LP) Frame 330

| | | | |
|---|---|---|---|
| Flit 1 339A | Header Field 331 | Reused Data 332A | |
| Flit 2 339B | Reused Data 332B | | |
| . . . | • • • | | |
| Flit N-1 339M | Reused Data 332M | | |
| Flit N 339N | Next Frame Field 335 | Reused Data 332N | Error Check Field 333 |

Receive a frame 401

Does the frame
have a next frame indicator?
402

NO

The current frame is a client
frame 408

Process the next frame as a non-low
power frame 410

YES

Does the next frame
indicator reflect the next frame is a
low power frame? 403

NO

The next frame is a NOP
frame 409

YES

Process the next frame as a low-power frame 404

Process a first portion of the low
power frame 405

Enable a clock gate for a second portion of
the low power frame 406

Disable the clock gate and process a third
portion of the low power frame 407

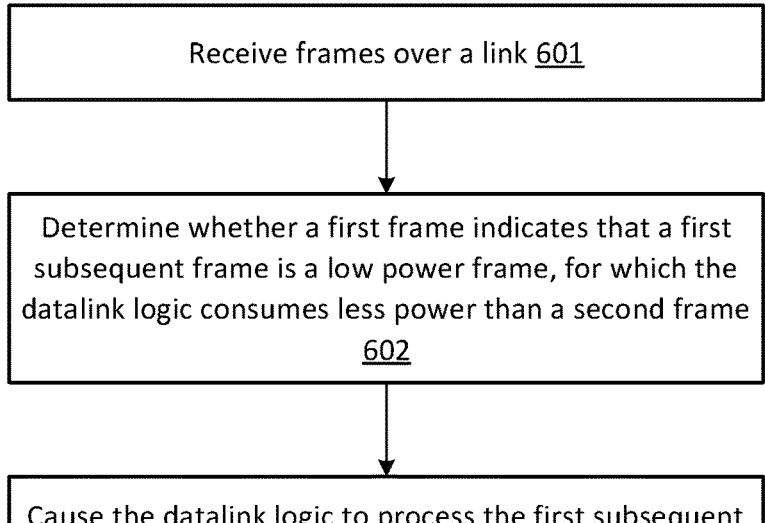

Receive frames over a link 601

Determine whether a first frame indicates that a first subsequent frame is a low power frame, for which the datalink logic consumes less power than a second frame 602

Cause the datalink logic to process the first subsequent frame as the low power frame type by enabling a clock gate for at least a portion of logic at the datalink layer used to process the low power frame type, responsive to determining the first frame indicates that the first subsequent frame is the low power frame type 603

FIG. 6

| PROCESSOR 702 | | EXECUTION UNIT 708 |
|---|---|---|
| CACHE 704 | REGISTER FILE 706 | LOW-POWER FRAME INSTRUCTION SET 709 |

PROCESSOR BUS 710

713

715

GRAPHICS/VIDEO CARD 712

MEMORY CONTROLLER HUB (MCH) 714

MEMORY 716

INSTRUCTION(S) 718

DATA 720

711

DATA STORAGE 722

TRANSCEIVER 724

FIRMWARE HUB 726

NETWORK CONTROLLER 728

I/O CONTROLLER HUB (ICH) 730

LEGACY I/O CONTROLLER 732

USER INPUT INTERFACE 734

SERIAL EXPANSION PORT 736

AUDIO CONTROLLER 738

700

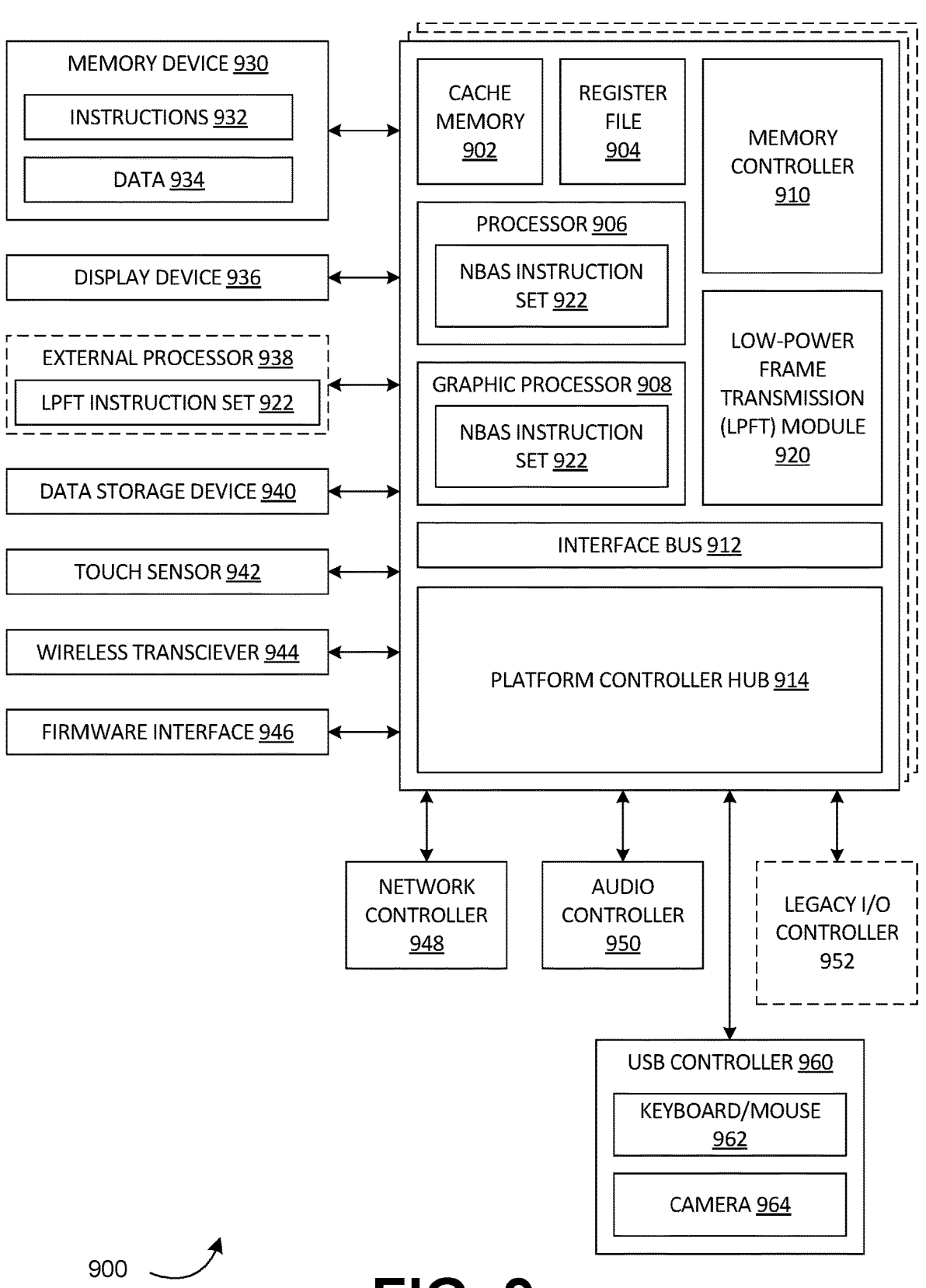

MEMORY DEVICE 930

INSTRUCTIONS 932

DATA 934

DISPLAY DEVICE 936

EXTERNAL PROCESSOR 938

LPFT INSTRUCTION SET 922

DATA STORAGE DEVICE 940

TOUCH SENSOR 942

WIRELESS TRANSCIEVER 944

FIRMWARE INTERFACE 946

CACHE MEMORY 902

REGISTER FILE 904

MEMORY CONTROLLER 910

PROCESSOR 906

NBAS INSTRUCTION SET 922

GRAPHIC PROCESSOR 908

NBAS INSTRUCTION SET 922

LOW-POWER FRAME TRANSMISSION (LPFT) MODULE 920

INTERFACE BUS 912

PLATFORM CONTROLLER HUB 914

NETWORK CONTROLLER 948

AUDIO CONTROLLER 950

LEGACY I/O CONTROLLER 952

USB CONTROLLER 960

KEYBOARD/MOUSE 962

CAMERA 964

LOW-POWER FRAME TRANSMISSION OVER A COMMUNICATION INTERCONNECT

TECHNICAL FIELD

At least one embodiment pertains to processor communications over a link, such as a datalink. For example, at least one embodiment pertains to low-power frame transmission over a communication interconnect.

BACKGROUND

In certain communication interconnect systems, such as chip-to-chip (C2C) interconnects, or die-to-die (D2D) interconnects, data transmitted across a link is often segmented into smaller units, commonly known as "frames," to facilitate efficient data handling. To preserve synchronization between chips or dies connected by the link, a continuous stream of frames is transmitted across the link. However, due to the variable nature of data processing at either chip or die, there can be instances where frames are transmitted without any actual data to be processed. This approach ensures a steady flow of communication, even during periods when there is no substantive data to transmit, thereby maintaining the integrity of the link and ensuring readiness for data transfer when needed.

BRIEF DESCRIPTION OF DRAWINGS

Various embodiments in accordance with aspects of the disclosure will be described with reference to the drawings, in which:

FIGS. 3A-3C are example illustrated representations of frame types transmitted and received across a link in a communication interconnect, according to aspects of the disclosure.

FIG. 4 is an example flow diagram of a method for processing frames received over a link in a communication interconnect, according to aspects of the disclosure.

FIG. 6 is an example flow diagram of a method for processing frames received over a link in a communication interconnect, according to aspects of the disclosure.

FIG. 9 is a block diagram of a processing system, according to aspects of the disclosure.

DETAILED DESCRIPTION

Figure 1:
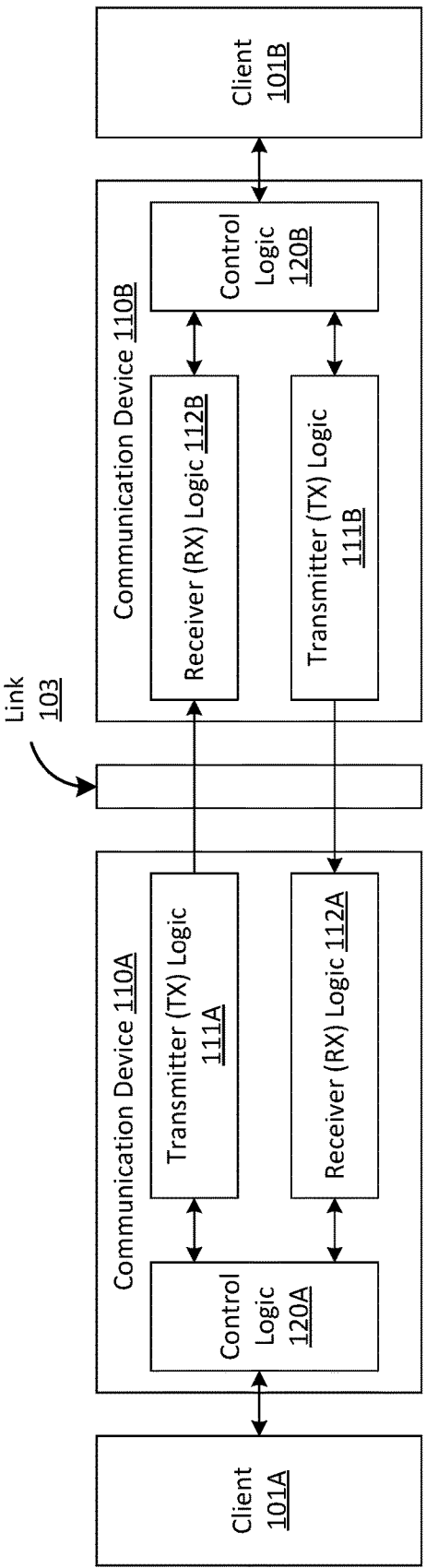
FIG. 1 is a block diagram of an example communication interconnect, according to aspects of the disclosure.

Data can be processed by multiple coupled integrated circuits (ICs) that may each perform different-sometimes specialized-functions. Often these ICs are colloquially referred to as 'chips,' with reference to the final stages of the semiconductor manufacturing process where the ICs (e.g., the chips) are cut from a larger semiconductor wafer. The ICs can be packaged with necessary input/output (I/O) connections, and other circuitry and the resulting apparatus can be referred to as a 'chip.' Thus, a 'communication interconnect' or 'chip-to-chip (C2C) interconnect' can describe an electrical and data coupling (e.g., interconnect) between at least two distinct chips (e.g., ICs). An unpackaged IC that has been cut from a larger semiconductor wafer can be colloquially referred to as a 'die.' Thus, a 'communication interconnect' or 'die-to-die (D2D) interconnect' can describe an electrical and data coupling (e.g., interconnect) between at least two distinct dies (e.g., ICs).

Synchronization in a communication interconnect is achieved by consistently transmitting and receiving frames in both directions at a regular rate (e.g., an active link). Here, a 'frame' refers to a defined package of data with a predetermined size. Often, it is more efficient to maintain an active link between chips rather than pausing and restarting the link based on data availability, and some physical links require an active link to constantly stream. Therefore, even in the absence of client data to be encapsulated in frames, empty frames, or frames without processable data, are still transmitted and received to keep the link active.

The integrity of the communication interconnect is upheld by data within each transmitted and received frame. Typically, each frame may contain header information, which may include information about the transmitting device, the link, and other relevant aspects of the interconnect. To ensure data accuracy, frames often carry error-checking data, such as cyclic redundancy check (CRC) data. The CRC data may be used to validate the integrity of the data communicated across the interconnect. In some configurations, the CRC data for an outgoing frame is generated based on header information from a recently received frame.

In certain configurations, frames are structured into multiple subframes, each of a fixed size. When a subframe is transmitted at a frequency of one per clock cycle, it is referred to as a 'flit.' In these scenarios, the initial flit of a frame typically contains the header information, while the final flit contains the CRC data.

Frames carrying client data are often termed 'client frames' (i.e., of the client frame type). Conversely, frames without client data are referred to as non-operational (NOP) frames (i.e., of the NOP frame type). NOP frames may carry crucial non-client data, such as information about the link, or the communication interconnect. However, some NOP frames might not contain processable data (e.g., irrelevant, or dummy data) and are transmitted and received solely to maintain the link. Generating and processing such irrelevant data in NOP frames may lead to power inefficiencies in the devices communicating over the interconnect.

Aspects and embodiments of the disclosure address these and other challenges by providing a specific frame type (referred to herein as a low-power frame type) that can be transmitted and received across an interconnect. Generating and processing these low-power frames may cause each device communicating over the interconnect to consume less power than generating and processing other frame types (e.g., client frames or NOP frames). Upon detecting that neither client data nor processable non-client data (e.g., link information, etc.) is being sent across the interconnect, a device may generate a low-power frame. The low-power frame can be generated by enabling a clock gate for a portion of the logic used to generate the low-power frame. With the clock gated, previously generated data held in the data pipeline (e.g., still available in respective registers) can be reused in the low-power frame as dummy data that can be ignored (e.g., not processed). While the clock is gated, the device generating the low-power frame may experience a lower power consumption (e.g., the power otherwise used to drive the gated clock). Similarly, a receiving device may process the low-power frame by enabling a clock gate for a portion of the logic used to process the dummy data contained in the low-power frame. While the clock is gated, the device processing the low-power frame may experience a lower power consumption (e.g., the power otherwise used to drive the gated clock).

Link synchronization and integrity can be maintained using the header information and error check information in a frame, and the transmitted data is not necessary to maintain the link. Thus, by filling the low-power frames with already generated data (e.g., dummy data) and abstaining from processing the dummy data in received low-power frames, both the transmitting and receiving device can experience power savings by transmitting and receiving low-power frames to maintain the synchronization and integrity of the interconnect. In some embodiments, the clock gate on the receiving device can be enabled after a flit including header information is processed. The clock gate may remain enabled for flits of the frame containing dummy data (e.g., intermediate flits). The clock gate can be disabled in time to process the flit containing error check information and/or next frame information (e.g., the last flit of the frame). In some embodiments, the clock gate can be enabled at a receiving device when a previously received frame has indicated that a subsequent frame (e.g., the current low-power frame) is a low-power frame. For example, a first frame may indicate that a second frame is a low-power frame (e.g., an indication that the second frame is a low-power frame). When the second frame (e.g., the low-power frame) is received, a portion of the logic used to process the low-power frame can be clock gated to avoid unnecessary processing of dummy data.

Advantages of the disclosure include, but are not limited to, an increased power efficiency in communication interconnects, and a reduced latency when transitioning between transmitting client frames and low-power frames. Additional advantages include simultaneously permitting communication in a first direction while restricting communication in a second direction, which can improve transmission of data in the first direction for protocols that use bidirectional transmission. Other advantages include improved reliability in communications, a reduction in corrupted frames and improved handling of received corrupted frames. Still other advantages include improved configurability in entering or exiting a low-power communication mode.

FIG. 1 is an example block diagram of a communication interconnect 100, according to aspects of the disclosure. The communication interconnect 100 includes client 101A and client 101B (also referred to herein as "client 101" or "client 101A/B") connected by link 103 via respectively coupled to communication device 110A and communication device 110B (also referred to herein as "communication device 110" or "communication device 110A/B"). Each communication device 110 respectively includes transmitter logic 111A and transmitter logic 111B (also referred to herein as "transmitter logic 111" or "transmitter logic 111A/B") and receiver logic 112A and receiver logic 112B (also referred to herein as "receiver logic 112" or "receiver logic 112A/B") that are coupled to control logic 120A and control logic 120B, respectively.

In embodiments, client 101 can be a computing or processing device that processes data in relation to a communication interconnect 100. For example, client 101 can be a computer processing unit (CPU), a graphics processing unit (GPU), a data processing unit (DPU), a neural processing unit (NPU), an application-specific integrated circuit (ASIC), a field programmable gate array (FPGA), or the like. These computing devices (e.g., clients 101) can be implemented in components in devices referred to as machines, computers, servers, network devices, or the like.

In embodiments, link 103 may connect clients 101 of the communication interconnect 100 (e.g., client 101A and client 101B) via respective communication devices (e.g., communication device 110A and communication device 110B). In some embodiments, link 103 can be an electrical link, radiofrequency (RF) link, optical link, or the like.

In embodiments, communication device 110 can be a device that interfaces with the client 101 to transmit and receive data over a two-way communication stream (e.g., link 103). As illustrated, communication device 110 is single device which includes transmitter logic 111 and receiver logic 112, however, in some embodiments, the functions of the communication device 110 can be performed by separate devices of the communication interconnect 100. In some embodiments, the communication device 110 may include a transceiver (not illustrated). In some embodiments, the communication device 110 may include a processor and/or communication device logic (not illustrated).

In embodiments, the communication device 110 is paired to a client 101 in a communication interconnect 100. As illustrated, the communication interconnect 100 includes two clients (e.g., client 101A and client 101B) that are paired to respective communication devices (e.g., communication device 110A and communication device 110B). The client 101 may cause the communication device 110 to transmit and receive data across the link 103 with another client. For example, client 101A may cause the communication device 110A to transmit data to the client 101B via the communication device 110B. The client 101 may cause data to be received across the link 103 from another client via the coupled communication device 110. For example, client 101B may cause the communication device 110B to provide data to the client 101B that is received from client 101A via communication device 110A.

In embodiments, the communication device 110 includes transmitter logic 111 and receiver logic 112. In some embodiments, some, or all of the transmitter logic 111 can be included in a transmitter or transceiver (not illustrated). In some embodiments, some or all of the receiver logic 112 can be included in a receiver or transceiver (not illustrated). The transmitter logic 111 may generate and transmit frames including data from the client 101 across the link 103 to another communication device 110. For example, the transmitter logic 111A may generate and transmit frames across the link 103 to the communication device 110B. The receiver logic may receive and process frames including data from the client 101 across the link 103 from another communication device 110. For example, the receiver logic 112B may receive and process frames including data from the client 101A across the link 103 via the communication device 110B. Additional details regarding the communication device 110, including details regarding the transmitter logic 111 and the receiver logic 112, are described with reference to FIG. 2, below.

In embodiments, the communication device 110 includes control logic 120. The control logic 120 can cause the communication device 110 to perform one or more functions, such as transmitting and receiving communications across the link 103. In some embodiments, the control logic 120 causes the communication device 110 to transmit a communication across the link 103, using the transmitter logic 111. That is, the control logic 120 causes the transmitter logic 111 to transmit the communication. In some embodiments, the control logic 120 causes the communication device 110 to receive a communication across the link 103 using the receiver logic 112. That is, the control logic 120 causes the receiver logic 112 to receive the communication. Additional details regarding the control logic 120 are described with reference to FIG. 2, below.

Figure 2:
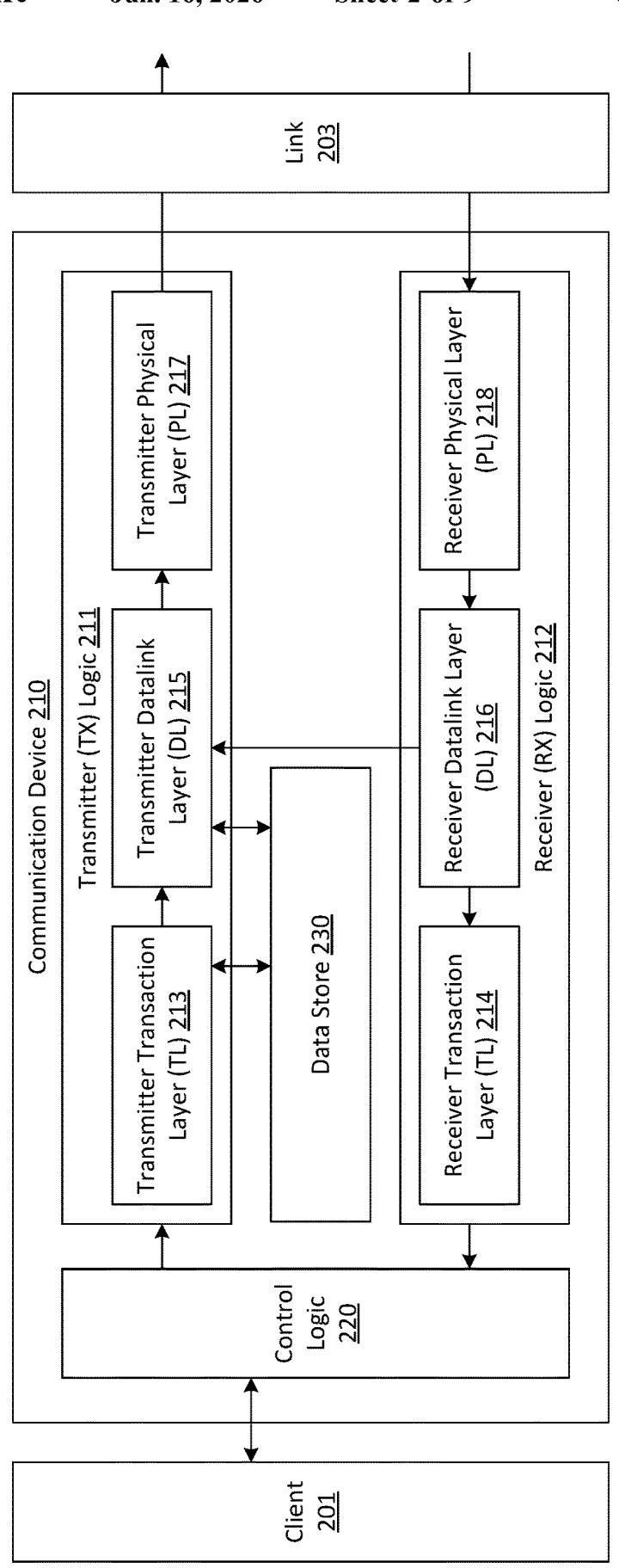
FIG. 2 is a block diagram of an example transceiver in a communication interconnect, according to aspects of the disclosure.

FIG. 2 is an example block diagram of a communication device 210 in a communication interconnect 200, according to aspects of the disclosure. In some embodiments, the client 201 is coupled to the communication device 210 (including transmitter logic 211, receiver logic 212, control logic 220, and data store 230). The communication device 210 can be the same as, or similar to the communication device 110 of FIG. 1 (including control logic 120, transmitter logic 111, and receiver logic 112). Likewise, in some embodiments, the communication interconnect 200, including client 201 and link 203 can be the same as, or similar to the communication interconnect 100, client 101, and link 103 respectively, of FIG. 1.

In embodiments, control logic 220 causes the communication device 210 to transmit and receive communications across the link 203. A primary clock (e.g., control clock, not illustrated) for the communication device 210 can be used to perform the operations of the control logic 220. In some embodiments, one or more operations of the transmitter logic 211 and/or the receiver logic 212 can be performed using the primary clock. Secondary clocks, such as a transmitter logic clock (not illustrated), or a receiver logic clock (not illustrated) can be synchronized to the primary clock. In some embodiments, control logic 220 can be performed using the primary clock while transmitter logic 211 and/or receiver logic 212 are not being performed. For example, a transmitter logic clock can be gated for a certain number of primary clock cycles. In another example, a receiver logic clock can be gated for a certain number of primary clock cycles. During this time, operations of the control logic 220 can continue to be performed, while operations of the transmitter logic 211 and/or receiver logic 212 are not being performed.

In embodiments, transmitter logic 211 includes a transmitter transaction layer 213, a transmitter datalink layer 215, and a transmitter physical layer 217. As previously described, the operations of the transmitter logic 211 can be performed using a secondary clock, or transmitter logic clock. In some embodiments, operations at the transmitter transaction layer 213, the transmitter datalink layer 215, and the transmitter physical layer 217 are performed using the transmitter logic clock. In alternative embodiments, the transmitter logic clock can synchronize individual clocks for each of the transmitter transaction layer 213, the transmitter datalink layer 215, and/or the transmitter physical layer 217.

At the transmitter transaction layer 213, the communication device 210 can receive communications from the client 201 that are to be sent to another communication device (not illustrated) over the link 203. In some embodiments, as illustrated, the transmitter transaction layer 213 can interface with the client 201 through the control logic 220. In alternative embodiments, the transmitter transaction layer 213 can directly interface with the client 201. In some embodiments, the transmitter transaction layer 213 can store data received from the client 201 in a cache (e.g., client data cache) at data store 230.

At the transmitter datalink layer 215, the communication device 210 can convert the message and/or data received from the client 201 into one or more messages that can be sent over the link 203. The communication device 210 transmits data as frames which include multiple flits, as is further described in FIGS. 3A-C. In some embodiments, the transmitter datalink layer 215 can access the client data at the data store 230 when generating frames to transmit across the link 203. In some embodiments, the transmitter datalink layer 215 can generate frame containing client data as long as client data is stored in the data store 230 (e.g., cached in data store 230). In some embodiments, once client data is no longer stored in data store 230, the transmitter datalink layer logic can generate frames that do not contain client data. In some embodiments, the control logic 220 can prevent the transmitter datalink layer 215 from generating new data for the frame.

In some embodiments, a frame contains header information, data to be transmitted, and error-correction information. The transmitter datalink layer 215 can generate a frame by generating the header information, obtaining data to be transmitted from a data pipeline, and generating error-correction information. In some embodiments, header information can be generated based on error-correction information obtained from a received frame (e.g., as illustrated by the arrow from receiver datalink layer 216 to the transmitter datalink layer 215). In some embodiments, the data pipeline can include client data, such as client data cached to data store 230 (e.g., by transmitter transaction layer 213). In some embodiments, the data pipeline can include data that is temporarily stored in physical components associated with the data pipeline (e.g., one or more registers, etc.). In some embodiments, the control logic 220 can cause the transmitter datalink layer 215 to use already available data (e.g., data stored in the data pipeline for a previous frame) as the data for a data frame. In some embodiments, the error-correction information can be cyclic redundancy check (CRC) information related to the frame. In other embodiments, additional error-correction information and methods are considered, including checksums, cryptographic error-checking methods, and the like.

At the transmitter physical layer 217, the communication device 210 via the transmitter logic 211 can transmit the frame generated at the transmitter datalink layer 215 across the link 203. In some embodiments, the transmitter physical layer 217 can be associated with physical hardware for physically coupling the communication device 210 to physical components of the link 203 (e.g., bonded wires, conductive traces, decouplable pins or connectors, etc.). In some embodiments, at the transmitter physical layer 217, the transmitter logic can convert the generated frame into one or more digital signals representative of data stored in the data frame. The digital signals can then be transmitted across the link 203 as a frame of data.

In embodiments, receiver logic 212 includes receiver transaction layer 214, receiver datalink layer 216, and receiver physical layer 218. As previously described, the operations of the receiver logic 212 can be performed using a secondary clock, or receiver logic clock. In some embodiments, operations at the receiver transaction layer 214, the receiver datalink layer 216, and the receiver physical layer 218 are performed using the receiver logic clock. In alternative embodiments, the receiver logic clock can synchronize individual clocks for each of the receiver transaction layer 214, the receiver datalink layer 216, and/or the receiver physical layer 218.

At the receiver physical layer 218, the communication device 210 via the receiver logic 212 can receive a frame from another communication device (not illustrated) across the link 203. In some embodiments, the receiver physical layer 218 can be associated with physical hardware for physically coupling the communication device 210 to physical components of the link 203 (e.g., bonded wires, conductive traces, decouplable pins or connectors, etc.). In some embodiments, at the receiver physical layer 218, the receiver logic can convert the received frame from one or more digital signals representative of data stored in a frame generated by the other communication device into a data frame. The receiver physical layer 218 can provide the received frame to the receiver datalink layer 216.

At the receiver datalink layer 216, the communication device 210 can extract the data received from the frame received over the link 203. The received frame can include multiple flits, as is further described in FIGS. 3A-C. In some embodiments, the receiver datalink layer 216 can perform one or more operations on the error-correction information included in the frame to verify the contents of the frame. If the frame is complete (e.g., not corrupted or otherwise damaged), in some embodiments, the receiver datalink layer 216 can provide data generated by verifying the error correction data to the transmitter datalink layer 215 for use in generating header information for an outgoing frame. In some embodiments, the header information from the received frame can similarly be provided to the transmitter datalink layer 215.

The receiver datalink layer 216 can provide the data extracted from the received frame to the receiver transaction layer. In some embodiments, the extracted data is client data from another client (not illustrated). In alternative embodiments, the extracted data is not client data, such as link information data, dummy data, etc. In some embodiments, the control logic 220 can prevent the receiver datalink layer 216 from extracting data from the received frame. The receiver datalink layer 216 can provide the extracted data to the receiver transaction layer 214.

At the receiver transaction layer 214, the communication device 210 can provide communications (e.g., data, frames, etc.) from another communication device (not illustrated). In some embodiments, the receiver transaction layer 214, or another component of the communication device 210 such as control logic 220 can reconstruct data obtained from multiple frames at the receiver datalink layer, into a cohesive dataset. In some embodiments, as illustrated, the receiver transaction layer 214 can interface with the client 201 through the control logic 220. In alternative embodiments, the receiver transaction layer 214 can directly interface with the client 201.

FIG. 3A, FIG. 3B, and FIG. 3C are example graphical representations 300A, 300B, and 300C of different respective frame types that are transmitted and received across a link in a communication interconnect, according to aspects of the disclosure. FIG. 3A illustrates a graphical representation 300A of a client frame 310. FIG. 3B illustrates a graphical representation 300B of a non-operational (NOP) frame 320. FIG. 3C illustrates a graphical representation 300C of a low-power frame 330.

Referring to FIG. 3A, the client frame 310 includes flits 319A-N (e.g., flit 1 319A, flit 2 319B, flit N−1 319M, and flit N 319N, etc.). Flit 1 319A includes header field 311, and client data 312A. In embodiments, header field 311 may include frame identification (ID) acknowledgement information (e.g., from previously, or simultaneously received frames), sender ID information, and/or recipient ID information, etc.

In embodiments, client data can be divided into multiple portions of client data, such as client data 312A, client data 312B, client data 312M, and client data 312N. In embodiments, the client data included in flit 1 319A (e.g., with header field 311) and the client data included in flit N 319N (e.g., with the error check field 313) can be of a smaller size than the client data included in intermediate flits (e.g., client data 312B of flit 2 319B, client data 312M of flit N−1 319M, etc.).

Flit N 319N of client frame 310 includes client data 312N and error check field 313. Error check field 313 may include information used for verifying that the frame has successfully been transmitted/received. In embodiments, error check field 313 may include checksum information, CRC information, or similar error checking information. In embodiments, header field 311 can be included in another flit of client frame 310. In embodiments, error check field 313 can be included in another flit of client frame 310 (e.g., flit 1 319A).

Referring to FIG. 3B, the NOP frame 320 includes flits 329A-N (e.g., flit 1 329A, flit 2 329B, flit N−1 329M, and flit N 329N, etc.). Flit 1 329A includes header field 321 and NOP data 322A. In embodiments, header field 321 of NOP frame 320 may include similar information as header field 311 of client frame 310.

In embodiments, NOP data can be divided into multiple portions of NOP data, such as NOP data 322A, NOP data 322B, NOP data 322M, and NOP data 322N. Similar to the client data of client frame 310, the NOP data 322A included in flit 1 329A and the NOP data 322N included in flit N 329N can be of a smaller size than the client data included in intermediate flits (e.g., NOP data 322B of flit 2 329B, NOP data 322M of flit N−1 329M, etc.). In embodiments, the NOP data 322A (as well as the NOP data 322B, NOP data 322M, and NOP data 322N) can be data that is not client data. For example, NOP data may include processable data, such as link control data (e.g., data used to maintain, establish, or alter the link connection), operational information, background processing tasks, and other non-client data. In another example, NOP data does not include processable data, which may include dummy data, junk data, reused data, pseudo-random data.

Flit N 329N of NOP frame 320 includes next frame field 325, NOP data 322, and error check field 323. In embodiments, error check field 323 may include similar information as error check field 313 of client frame 310. The next frame field 325 may include information (e.g., an indication) regarding the type of frame of a subsequent (e.g., "next") frame. For example, if a NOP frame 320 is subsequently followed by a client frame 310, the next frame field 325 would indicate a client frame 310 (e.g., that a client frame 310 is the "next frame"). In another example, if the NOP frame 320 is subsequently followed by a NOP frame 320, the next frame field 325 would indicate a NOP frame 320 (e.g., that a NOP frame 320 is the "next frame"). In a third example, if the NOP frame 320 is subsequently followed by a low-power frame 330, the next frame field 325 would indicate a low-power frame 330 (e.g., that a low-power frame 330 is the "next frame").

Referring to FIG. 3C, the low-power frame 330 includes flits 339A-N (e.g., flit 1 339A, flit 2 339B, flit N−1 339M, and flit N 339N, etc.). Flit 1 339A includes header field 331 and reused data 332A. In embodiments, header field 331 of low-power frame 330 may include similar information as header field 311 of client frame 310, and/or header field 321 of NOP frame 320.

In embodiments, reused data 332A, reused data 332B, reused data 332M, and reused data 332N can be data that was generated for previous frames (e.g., dummy data). Reused data may not be specifically generated for the low-power frame 330, and instead corresponds to data that is still in the data pipeline (e.g., data registers, etc.) corresponding to each flit of the low-power frame 330. For example, if a low-power frame 330 is generated after a NOP frame 320, reused data 332A could be the same as—or similar to—NOP data 322A, reused data 332B could be the same as—or similar to—NOP data 322B, reused data 332M could be the same as—or similar to—NOP data 322M, and reused data 332N could be the same as—or similar to—NOP data 322N. In this way, a clock signal does not need to be used to generate new data for flits that contain reused data (e.g., the clock signal can be gated for flit 2 339B containing the reused data 332B through flit N1 339M containing the reused data 332M).

Flit N 339N of low-power frame 330 includes next frame field 335, reused data 332N, and error check field 333. In embodiments, error check field 333 may include similar information as error check field 313 of client frame 310 or error check field 323 of NOP frame 320. In embodiments, next frame field 335 may include similar information as next frame field 325 of NOP frame 320.

FIG. 4 is an example flow diagram of an example method 400 for processing frames received over a link in a communication interconnect, according to aspects of the disclosure. The method 400 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the transmitter logic 111 and/or receiver logic 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 401, the control logic performing the method 400 receives a frame. The frame can be a client frame, a NOP frame, or a low-power frame. In embodiments, the control logic may receive a set of frames, or a series of frames. The series of frames can be continuously received. That is, the series of frames can be part of a continuous two-way communication stream between two devices.

At operation 402, the control logic determines whether the frame includes a next frame indicator. If the frame includes the next frame indicator, the control logic proceeds to operation 403. If the frame does not include the next frame indicator, the control logic identifies the current frame as a client frame (at operation 408), and processes the next frame as a non-low-power frame (at operation 410). NOP frame types and low-power frame types may include next-frame indicators. In some embodiments, a client frame may include a next-frame indicator.

At operation 403, the control logic determines whether the next frame indicator reflects that the next frame is a low-power frame. If the next frame indicator reflects that the next frame is a low-power frame, the control logic proceeds to operation 404. If the frame indicator reflects that the next frame is not a low-power frame, the control logic identifies the next frame as a non-operational (NOP) frame (at operation 409), and processes the next frame as a non-low-power frame (at operation 410). In embodiments, the control logic may process data in client frame types and NOP frame types with the same process (e.g., without a clock-gating mechanism that gates a clock for a portion of the frame processing operation).

At operation 404, the control logic processes the frame as a low-power frame. Operation 404 includes the operations 405, 406, and 407.

At operation 405, the control logic processes a first portion of the low-power frame. The first portion may include the frame header. The frame header may include link information, such as an identifier of the recipient, an identifier of the sender, and/or other communication link data. In embodiments, the first portion may include additional information such as the frame error check information or the next-frame indicator.

At operation 406, the control logic enables a clock gate for a second portion of the low-power frame. In some embodiments, a main clock can be used for timing the control logic, while a secondary clock can be used for timing the logic to process the low-power frame. Thus, the secondary clock can be gated for a predetermined number of main clock cycles after detecting that the frame being processed is a low-power frame.

At operation 407, the control logic disables the clock gate (e.g., on the secondary clock) and processes a third portion of the low-power frame. In embodiments, the third portion of the low-power frame includes the next-frame indicator. In embodiments, the third portion of the low-power frame includes frame error check information. The control logic may disable the clock gate in time for the first portion of a next frame to be processed.

At operation 408, referenced above, the control logic may identify the current frame as a client frame. In embodiments, operation 408 is not performed, and the control logic proceeds directly to operation 410. In some embodiments, the control logic only identifies the low-power frame type. That is, if the next-frame indicator indicates that the next frame is a low-power frame, the control logic identifies the next frame as a low-power frame, and if the next frame indicator indicates that the next frame is a client frame or a NOP frame, the control logic identifies the next frame as not a low-power frame.

At operation 409, referenced above, the control logic may identify the next frame as a NOP frame. In some embodiments, operation 409 is not performed, and the control logic proceeds directly to operation 410.

At operation 410, referenced above, the control logic processes a next frame (e.g., the frame after the frame received in operation 401) as a non-low-power frame. That is, the full contents of the frame (e.g., each subframe, or "flit") is processed, in contrast to operation 404 used for processing low-power frames, where only a first and third portion of the low-power frame can be processed.

Figure 5:
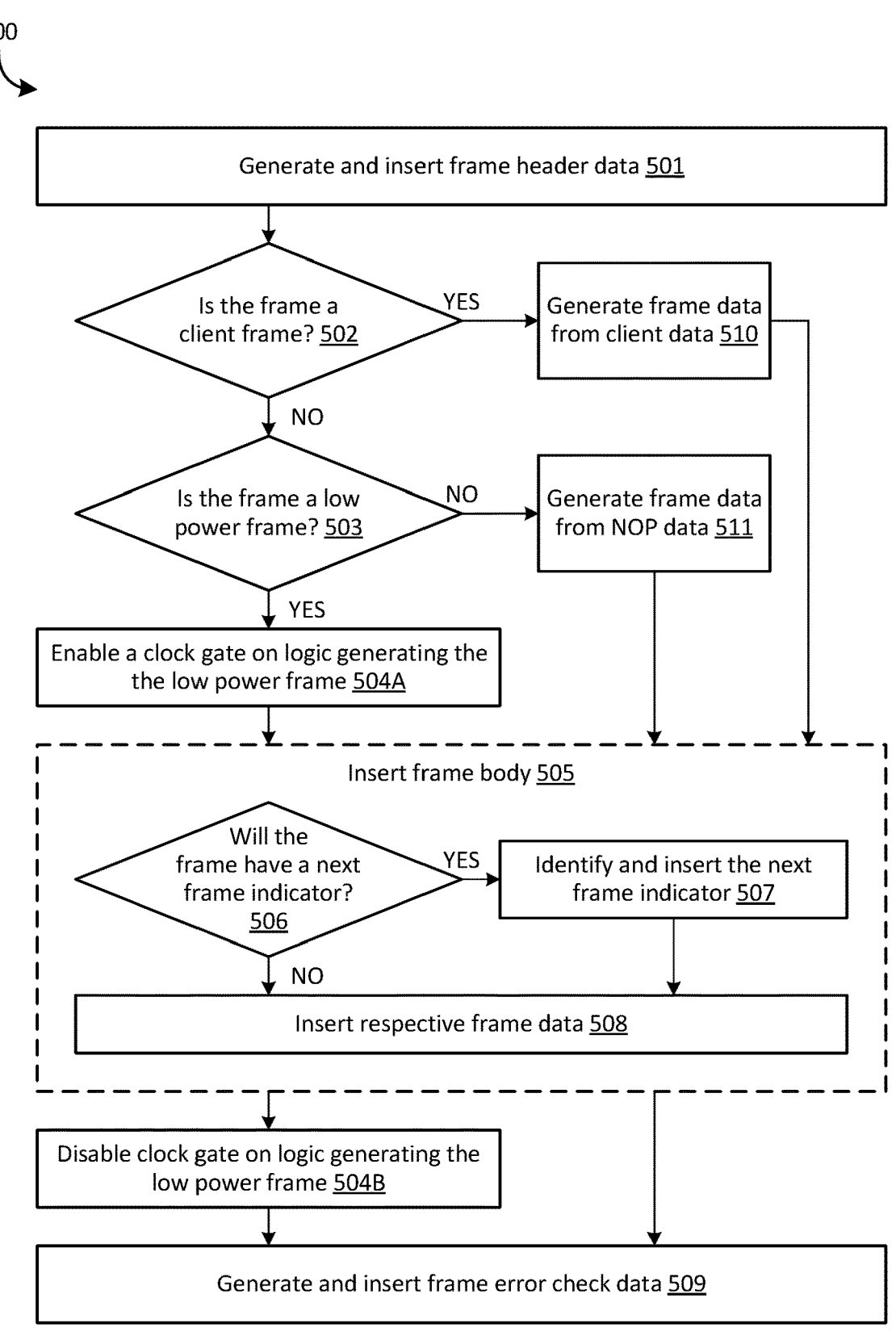
FIG. 5 is an example flow diagram of a method for generating frames to be transmitted over a link in a communication interconnect.

FIG. 5 is an example flow diagram of an example method 500 for generating frames to be transmitted over a link in a communication interconnect. The method 500 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the transmitter logic 111 and/or receiver logic 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 501, the control logic performing the method 500 generates and inserts frame header data. Frame header data can be the same for client frame types, NOP frame types, and low-power frame types. In embodiments, frame header data may include link communication confirmation from previously or "simultaneously" received frames.

At operation 502, the control logic determines whether the frame is a client frame. If the frame is not a client frame, the control logic proceeds to operation 503. If the frame is a client frame, the control logic proceeds to operation 510, where the control logic generates frame data from the client data. After performing operation 510, the control logic proceeds to operation 505, where the control logic inserts data into the client frame.

At operation 503, the control logic determines whether the frame is a low-power frame. If the frame is a low-power frame, the control logic proceeds to operation 504A. If the frame is not a low-power frame, the control logic proceeds to operation 511, where the control logic generates frame data from NOP data. After performing operation 511, the control logic proceeds to operation 505.

At operation 504A, the control logic enables a clock gate on the logic generating the low-power frame. In some embodiments, a main clock can be used for timing the control logic, while a secondary clock can be used for timing the logic to generate the low-power frame. Thus, the secondary clock can be gated for a predetermined number of main clock cycles after detecting that the frame being generated is a low-power frame.

At operation 505, the control logic inserts the frame body. Operation 505 includes the operations 506, 507, and 508. The frame body includes frame data generated in either operation 510, or operation 511 (for client data or NOP data respectively), and a next frame indicator as applicable (e.g., for NOP frame types and low-power frame types). In embodiments, the frame body may refer to information in a frame that is not included in the header data or the error check data.

At operation 506, the control logic determines whether the frame will have a next frame indicator. Client frames do not have a next frame indicator, whereas NOP frames and low-power frames do have a next frame indicator. In some embodiments, client frames may have a next frame indicator.

At operation 507, the control logic identifies and inserts the next frame indicator. The next frame indicator reflects a next frame type (e.g., client frame, NOP frame, low-power frame, etc.).

At operation 508, the control logic inserts the respective frame data. In embodiments, operation 505 (and included operations 506, 507, and 508) can be performed concurrently with operations 501 and 509. That is, in embodiments, a portion of frame body can be inserted into the same flit as header data (e.g., as in operation 501), and another portion of frame body can be inserted into the same flit as error check data (e.g., as in operation 509).

At operation 504B, if operation 504A was performed, the control logic disables the clock gate on logic generating the low-power frame. In embodiments, the clock gate can be enabled for a predetermined quantity of flits, corresponding to a quantity of flits in a low-power frame that contain reused, or non-relevant data.

At operation 509, the control logic generates and inserts frame error check data. In embodiments, the frame error check data can be inserted in the same flit as the header data (e.g., as in operation 501). In such embodiments, the clock gate enabled and disabled in operations 504A and 504B respectively can be enabled for a single flit of the low-power frame.

FIG. 6 is an example flow diagram of an example method 600 for processing frames received over a link in a communication interconnect, according to aspects of the disclosure. The method 600 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the transmitter logic 111 and/or receiver logic 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 601, the control logic performing the method 600 receives frames over a link.

At operation 602, the control logic determines whether a first frame indicates that a first subsequent frame is a low-power frame type, for which the datalink logic consumes less power than a second frame type. In embodiments, the control logic determines whether the first frame comprises a subsequent frame type indicator. The subsequent frame type indicator may reflect a frame type of a respective subsequent frame. The control logic may cause the datalink logic to process the first subsequent frame as the second frame type responsive to determining the first frame does not include the subsequent frame type indicator. The low-power frame type may include a subsequent frame type indicator. A NOP frame type may include the subsequent frame type indicator.

At operation 603, the control logic causes the datalink logic to process the first subsequent frame as the low-power frame type by enabling a clock gate for at least a portion of logic at the datalink layer used to process the low-power frame type, responsive to determining the first frame indicates that the first subsequent frame is the low-power frame type. In embodiments, the control logic causes the datalink logic to process a first portion of the low-power frame type. Responsive to processing the first portion of the low-power frame type, the control logic may cause the datalink logic to not process a second portion of the low-power frame type by enabling the clock gate for the datalink logic. The control logic may disable the clock gate for the datalink logic, and cause the datalink logic to process a third portion of the low-power frame type. In embodiments, the control logic may cause the datalink logic to process the first subsequent frame as the second frame type, responsive to determining the first frame does not indicate that the first subsequent frame is the low-power frame type.

In embodiments, the first subsequent frame is a second frame, and the control logic may determine whether a second subsequent frame (e.g., a frame following the first subsequent frame, or the "second frame") is the low-power frame type. The control logic may cause the datalink logic to process the second subsequent frame as the second frame type, responsive to determining the second frame indicates that the second subsequent frame is not the low-power frame type.

In embodiments, the control logic may cause second datalink logic to generate a second frame as the second frame type, and cause transmitter logic to transmit the second frame over the link. The control logic may further cause the second datalink logic to generate a third frame as the low-power frame type, using a portion of the second frame and cause the transmitter logic to transmit the third frame over the link. In embodiments, the control logic may enable a second clock gate for at least a portion of the second datalink logic used to generate the low-power frame type.

In embodiments, the control logic determines to generate a third frame as the low-power frame type, based on a second frame including a last portion of client data. That is, once client data has been transferred, a low-power frame can be generated. The control logic may alternatively determine to generate a NOP frame immediately following a last client frame. In embodiments, a data buffer may fill with client data, and when quantity of data in the cache satisfies a threshold quantity, (e.g., a specified threshold quantity, when the data buffer is empty, etc.), the control logic may determine to generate a client frame, a NOP frame, or a low-power frame, depending on the threshold quantity. For example, if a quantity of client data in the data buffer exceeds a threshold quantity, the control logic may determine that client data can be sent in client frame types. In another example, if a quantity of client data in the data buffer falls below a threshold quantity (e.g., a pre-determined quantity of client data, or there is no client data), the control logic may determine that client frames can be replaced with NOP frames and/or low-power frames. In embodiments, a NOP frame follows a last client frame. In alternative embodiments, a low-power frame may follow the last client frame. Client frames may follow client frames, NOP frames, or low-power frames in communication over a communication interconnect. In embodiments, the data buffer can be one of multiple caches coupled to the control logic.

Computer Systems

Figure 7:
FIG. 7 is a block diagram illustrating an exemplary computer system which can be a system with interconnected devices and components, a system-on-a-chip (SOC), or some combination thereof, according to aspects of the disclosure.

FIG. 7 is a block diagram illustrating an exemplary computer system, such as computer system 700, which can be a system with interconnected devices and components, a system-on-a-chip (SOC), or some combination thereof, according to aspects of the disclosure. In some embodiments, computer system 700 can include, without limitation, a component, such as a processor 702, to employ execution units including logic to perform algorithms for process data, in accordance with the present disclosure, such as in the embodiments described herein. In some embodiments, computer system 700 can include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In some embodiments, computer system 700 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In some embodiments, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In some embodiments, computer system 700 can include, without limitation, processor 702 that can include, without limitation, one or more execution units 708 to perform operations according to techniques described herein. In some embodiments, computer system 700 is a single-processor desktop or server system, but in another embodiment, the computer system 700 can be a multiprocessor system. In some embodiments, processor 702 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In some embodiments, processor 702 can be coupled to a processor bus 710 that can transmit data signals between processor 702 and other components in computer system 700.

In some embodiments, processor 702 can include, without limitation, a Level -1 (L1) internal cache memory 704. In some embodiments, processor 702 can have a single internal cache or multiple levels of internal cache. In some embodiments, the cache memory can reside external to processor 702. Other embodiments can also include a combination of both internal and external caches depending on particular implementation and needs. In some embodiments, register file 706 can store different types of data in various registers, including and without limitation, integer registers, floating-point registers, status registers, and instruction pointer registers.

In some embodiments, an execution unit 708, including and without limitation, logic to perform integer and floating-point operations, also reside in processor 702. In some embodiments, processor 702 can also include a microcode (ucode) read-only memory (ROM) that stores microcode for certain macro instructions. In some embodiments, execution unit 708 can include logic to handle a low-power frame instruction set 709. In some embodiments, by including low-power frame instruction set 709 in an instruction set of a general-purpose processor, such as processor 702, along with associated circuitry to execute instructions, operations used by many multimedia applications can be performed using packed data in a general-purpose processor, such as processor 702. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In some embodiments, execution unit 708 can also be used in microcontrollers, embedded processors, graphics devices, DSPs, and other types of logic circuits. In some embodiments, computer system 700 can include, without limitation, a memory 716. In some embodiments, memory 716 can be implemented as a Dynamic Random Access Memory (DRAM) device, a Static Random Access Memory (SRAM) device, a flash memory device, or other memory devices. In some embodiments, memory 716 can store instruction(s) 718 and/or data 720 represented by data signals that can be executed by processor 702.

In some embodiments, the system logic chip can be coupled to processor bus 710 and memory 716. In some embodiments, the system logic chip can include, without limitation, a memory controller hub (MCH), such as MCH 714, and processor 702 can communicate with MCH 714 via processor bus 710. In some embodiments, MCH 714 can provide a high bandwidth memory path 715 to memory 716 for instruction and data storage and for storage of graphics commands, data, and textures. In some embodiments, MCH 714 can direct data signals between processor 702, memory 716, and other components in computer system 700 and bridge data signals between processor bus 710, memory 716, and a system input/output (I/O) 711. In some embodiments, a system logic chip can provide a graphics port for coupling to a graphics controller. In some embodiments, MCH 714 can be coupled to memory 716 through a high bandwidth memory path 715, and graphics/video card 712 can be coupled to MCH 714 through an Accelerated Graphics Port (AGP) interconnect 713.

In some embodiments, computer system 700 can use the system I/O 711 that is a proprietary hub interface bus to couple the MCH 714 to I/O controller hub (ICH), such as ICH 730. In some embodiments, ICH 730 can provide direct connections to some I/O devices via a local I/O bus. In some embodiments, a local I/O bus can include, without limitation, a high-speed I/O bus for connecting peripherals to memory 716, chipset, and processor 702. Examples can include, without limitation, data storage 722, a transceiver 724, a firmware hub (flash Basic Input/Output System (BIOS)) 726, a network controller 728, a legacy I/O controller 732 containing a user input interface 734, a serial expansion port 736, such as Universal Serial Bus (USB), and an audio controller 738. In some embodiments, data storage 722 can include a hard disk drive, a floppy disk drive, a compact disc read-only memory (CD-ROM) device, a flash memory device, or other mass storage devices.

In some embodiments, FIG. 7 illustrates a computer system 700, which includes interconnected hardware devices or "chips," whereas, in other embodiments, FIG. 7 can illustrate an exemplary System on a Chip (SoC). In some embodiments, devices can be interconnected with proprietary interconnects, standardized interconnects (e.g., Peripheral Component Interconnect buses (e.g., PCI, PCI Express)), or some combination thereof. In some embodiments, one or more components of computer system 700 are interconnected using compute express link (CXL) interconnects.

Figure 8:
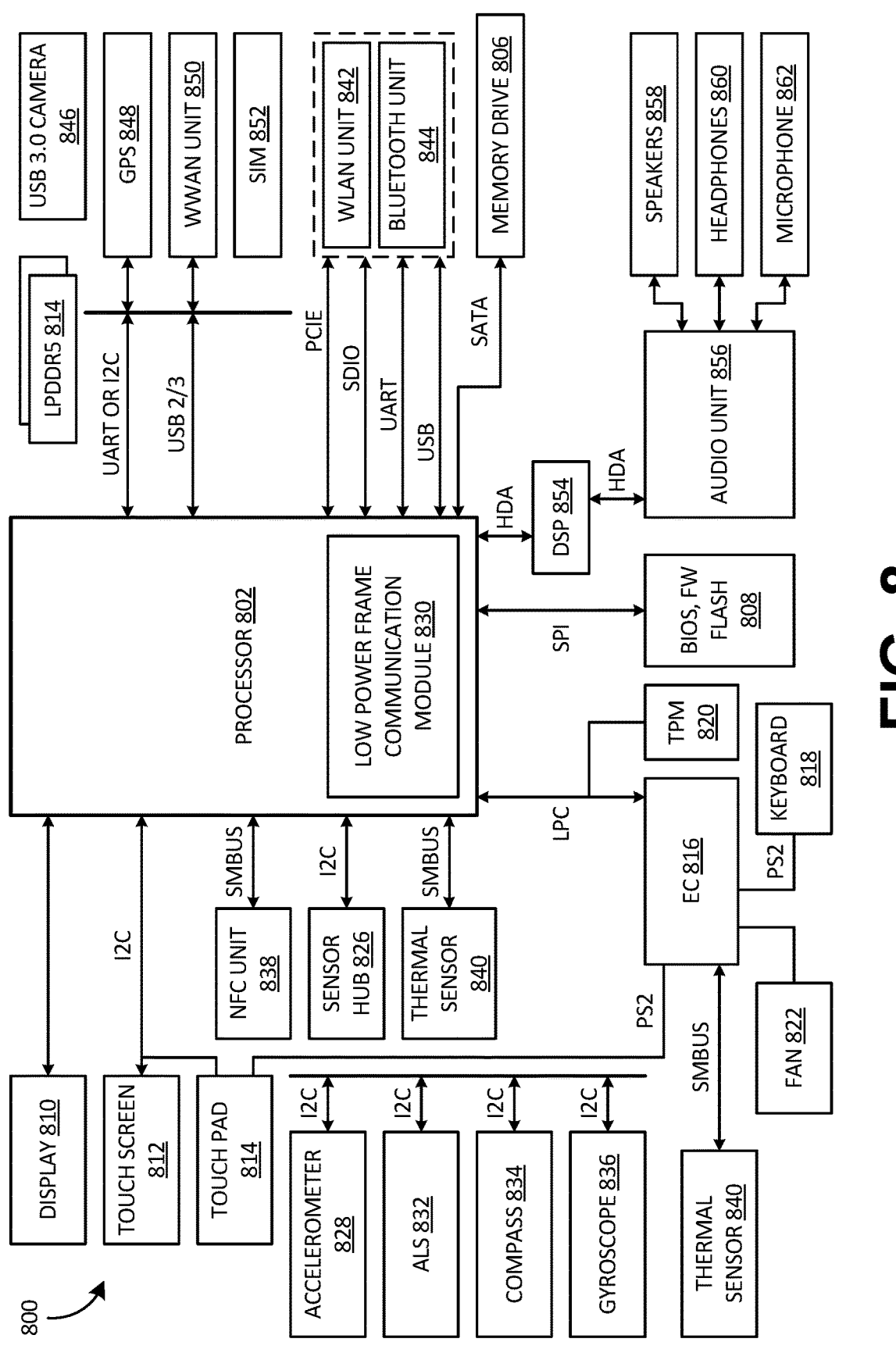
FIG. 8 is a block diagram illustrating an electronic device for utilizing a processor, according to aspects of the disclosure.

FIG. 8 is a block diagram illustrating an electronic device 800 for utilizing a processor 802, according to aspects of the disclosure. In some embodiments, electronic device 800 can be, for example, and without limitation, a notebook, a tower server, a rack server, a blade server, a laptop, a desktop, a tablet, a mobile device, a phone, an embedded computer, or any other suitable electronic device.

In some embodiments, electronic device 800 can include, without limitation, processor 802 communicatively coupled to any suitable number or kind of components, peripherals, modules, or devices. In some embodiments, processor 802 coupled using a bus or interface, such as an Inter-Integrated Circuit (I2C) bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including USB 1.0/1/1, USB 2.0, USB 3.0/3.1 Gen1/3.1 Gen2, and USB4), or a Universal Asynchronous Receiver/Transmitter (UART) bus. In some embodiments, FIG. 8 illustrates a system, which includes interconnected hardware devices or "chips," whereas in other embodiments, FIG. 8 can illustrate an exemplary System on a Chip (SoC). In some embodiments, devices illustrated in FIG. 8 can be interconnected with proprietary interconnects, standardized interconnects (e.g., PCIe), or some combination thereof. In some embodiments, one or more components of FIG. 8 are interconnected using compute express link (CXL) interconnects.

In some embodiments, FIG. 8 can include a display 810, a touch screen 812, a touch pad 814, a Near Field Communications unit (NFC) 838, a sensor hub 826, a thermal sensor 840, an Express Chipset (EC), such as EC 816, a Trusted Platform Module (TPM), such as TPM 820, BIOS/firmware (FW)/flash memory, such as BIOS, FW Flash 808, a DSP 854, a memory drive 806 such as a Solid State Disk (SSD) or a Hard Disk Drive (HDD), a wireless local area network unit (WLAN), such as WLAN unit 842, a Bluetooth unit 844, a Wireless Wide Area Network unit (WWAN), such as WWAN unit 850, a Global Positioning System (GPS) 848, a camera (USB 3.0 camera) 846, such as a USB 3.0 camera, and/or a Low Network bandwidth Double Data Rate (LPDDR) memory unit, such as LPDDR5 804 implemented in, for example, LPDDR5 standard. These components can each be implemented in any suitable manner.

In some embodiments, other components can be communicatively coupled to processor 802 through the components discussed above. In some embodiments, processor 802 can include a low-power frame transmission module 830. In some embodiments, an accelerometer 828, Ambient Light Sensor (ALS), such as ALS 832, compass 834, and a gyroscope 836 can be communicatively coupled to sensor hub 826. In some embodiments, thermal sensor 840, a fan 822, a keyboard 818, and a touch pad 814 can be communicatively coupled to EC 816. In some embodiments, speakers 858, headphones 860, and microphone 862 can be communicatively coupled to an audio unit 856 which can, in turn, be communicatively coupled to DSP 854. In some embodiments, audio unit 856 can include, for example, and without limitation, an audio coder/decoder (codec) and a class-D amplifier. In some embodiments, a subscriber identification module (SIM) card, such as SIM 852 can be communicatively coupled to WWAN unit 850. In some embodiments, components such as WLAN unit 842 and Bluetooth unit 844, as well as WWAN unit 850 can be implemented in a Next Generation Form Factor (NGFF).

FIG. 9 is a block diagram of a processing system 900, according to aspects of the disclosure. In some embodiments, the processing system 900 includes cache memory 902, register file 904, processors 906, graphics processors 908, memory controller 910, interface bus 912, platform controller hub 914, and low-power frame transmission module 920. Processing system 900 can be a single processor desktop system, a multiprocessor workstation system, or a server system having a large number of processors 906 or graphics processors 908. In some embodiments, the processing system 900 is a processing platform incorporated within a system-on-a-chip (SoC) integrated circuit for use in mobile, handheld, or embedded devices.

In some embodiments, the processing system 900 can include, or be incorporated within a server-based gaming platform, a game console, including a game and media console, a mobile gaming console, a handheld game console, or an online game console. In some embodiments, the processing system 900 is a mobile phone, smart phone, tablet computing device, or mobile Internet device. In some embodiments, the processing system 900 can also include, couple with, or be integrated within, a wearable device, such as a smart watch wearable device, smart eyewear device, augmented reality device, or virtual reality device. In some embodiments, the processing system 900 is a television or set-top box device having one or more processors 906 and a graphical interface generated by one or more graphics processors 908.

In some embodiments, one or more processors 906 each include one or more of the processor cores to process instructions which, when executed, perform operations for system and user software. In some embodiments, one or more processors 906 and/or one or more graphics processors can be configured to process a portion of the low-power frame transmission (LPFT) instruction set, such as LPFT instruction set 922. In some embodiments, LPFT instruction set 922 can facilitate Complex Instruction Set Computing (CISC), Reduced Instruction Set Computing (RISC), or computing via a Very Long Instruction Word (VLIW). In some embodiments, processor cores can each process a different instruction set from LPFT instruction set 922, which can include instructions to facilitate emulation of other instruction sets (not illustrated). In some embodiments, processor cores can also include other processing devices, such as a Digital Signal Processor (DSP).

In some embodiments, processors 906 includes cache memory 902. In some embodiments, processors 906 can have a single internal cache or multiple levels of internal cache. In some embodiments, cache memory 902 is shared among various components of processors 906. In some embodiments, processors 906 also uses an external cache (e.g., a Level-3 (L3) cache or Last Level Cache (LLC)) (not illustrated), which can be shared among processor cores using known cache coherency techniques. In some embodiments, register file 904 is additionally included in processors 906, which can include different types of registers for storing different types of data (e.g., integer registers, floating-point registers, status registers, and an instruction pointer register). In some embodiments, register file 904 can include general-purpose registers or other registers.

In some embodiments, one or more processors 906 are coupled with one or more interface bus 912 to transmit communication signals such as address, data, or control signals between processor cores and other components in processing system 900. In some embodiments, interface bus 912, in one embodiment, can be a processor bus, such as a version of a Direct Media Interface (DMI) bus. In some embodiments, interface bus 912 is not limited to a DMI bus, and can include one or more PCI buses (e.g., PCI, PCI Express), memory busses, or other types of interface busses. In some embodiments, processors 906 include an integrated memory controller (e.g., memory controller 910) and a platform controller hub 914 (PCH). In some embodiments, memory controller 910 facilitates communication between a memory device and other components of the processing system 900, while platform controller hub 914 provides connections to I/O devices via a local I/O bus.

In some embodiments, the memory device 930 can be a dynamic random-access memory (DRAM) device, a static random-access memory (SRAM) device, a flash memory device, a phase-change memory device, or some other memory device having suitable performance to serve as process memory. In some embodiments, the memory device 930 can operate as system memory for processing system 900 to store instructions 932 and data 934 for use when one or more processors 906 executes an application or process. In some embodiments, memory controller 910 also optionally couples with an external processor 938, which can communicate with one or more graphics processors 908 in processors 906 to perform graphics and media operations. In some embodiments, a display device 936 can connect to processors 906. In some embodiments, the display device 936 can include one or more of an internal display device, as in a mobile electronic device or a laptop device, or an external display device attached via a display interface (e.g., DisplayPort, etc.). In some embodiments, display device 936 can include a head-mounted display (HMD) such as a stereoscopic display device for use in virtual reality (VR) applications or augmented reality (AR) applications.

In some embodiments, the platform controller hub 914 enables peripherals to connect to memory device 930 and processors 906 via a high-speed I/O bus. In some embodiments, I/O peripherals include, but are not limited to, a data storage device 940 (e.g., hard disk drive, flash memory, etc.), a touch sensor 942, a wireless transceiver 944, firmware interface 946, a network controller 948, or an audio controller 950.

In some embodiments, the data storage device 940 can connect via a storage interface (e.g., SATA) or via a peripheral bus, such as a PCI bus (e.g., PCI, PCI Express). In some embodiments, touch sensor 942 can include touch screen sensors, pressure sensors, or fingerprint sensors. In some embodiments, wireless transceiver 944 can be a Wi-Fi transceiver, a Bluetooth transceiver, or a mobile network transceiver such as a 3G, 4G, Long Term Evolution (LTE), 5G, or 6G transceiver. In some embodiments, firmware interface 946 enables communication with system firmware and can be, for example, a unified extensible firmware interface (UEFI). In some embodiments, the network controller 948 can enable a network connection to a wired network. In some embodiments, a high-performance network controller (not illustrated) couples with interface bus 912. In some embodiments, audio controller 950 can be a multi-channel high-definition audio controller. In some embodiments, the processing system 900 includes an optional legacy I/O controller 952 for coupling legacy (e.g., Personal System-2 (PS/2)) devices to the processing system 900. In some embodiments, the platform controller hub 914 can also connect to one or more Universal Serial Bus (USB) controllers, such as USB controller 960 to connect input devices, such as a keyboard and mouse combination (keyboard/mouse 962), a camera 964, or other USB input devices.

In some embodiments, an instance of memory controller 910 and platform controller hub 914 can be integrated into a discreet external graphics processor, such as external processor 938. In some embodiments, the platform controller hub 914 and/or memory controller 910 can be external to one or more processors 906. For example, in some embodiments, the processing system 900 can include an external memory controller (e.g., memory controller 910) and the platform controller hub 914, which can be configured as a memory controller hub and peripheral controller hub within a system chipset that is in communication with the processors 906.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In some embodiments, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In some embodiments, code is stored on a computer-readable storage medium, for example, in form of a computer program comprising a plurality of instructions executable by one or more processors. In some embodiments, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In some embodiments, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in some embodiments, comprises multiple non-transitory computer-readable storage media and one or more of individual non-transitory storage media of multiple non-transitory computer-readable storage media lacks all of the code while multiple non-transitory computer-readable storage media collectively store all of the code. In some embodiments, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In some embodiments, different components of a computer system have separate processors, and different processors execute different subsets of instructions.

Accordingly, in some embodiments, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:
receiver logic to sequentially receive a series of frames over a link;
datalink logic coupled to the receiver logic, to process the series of frames; and
control logic coupled to the receiver logic and the datalink logic, the control logic to:

determine whether a first frame indicates that a second frame is a first low-power frame, for which the datalink logic consumes less power than a second first client frame; and
responsive to determining that the first frame indicates that the second frame is the first low-power frame, cause the datalink logic to enable a first clock gate for at least a portion of the datalink logic used to process a first portion of the first low-power frame comprising dummy data, wherein enabling the first clock gate causes the datalink logic to abstain from processing the dummy data in the first portion of the first low-power frame.

2. The device of claim 1, the control logic further to:
cause the datalink logic to process a second portion of the first low-power frame;
responsive to processing the second portion of the first low-power frame, enable the first clock gate for the datalink logic;
disable the first clock gate for the datalink logic; and
cause the datalink logic to process a third portion of the first low-power frame.

3. The device of claim 1, the control logic further to:
cause the datalink logic to process the second frame as the first client frame, responsive to determining that the first frame does not indicate that the second frame is the first low-power frame.

4. The device of claim 1, wherein to determine whether the first frame indicates that the second frame is the first low-power frame, the control logic is to:
determine whether the first frame comprises a subsequent frame indicator, wherein the subsequent frame indicator reflects a frame type of a respective subsequent frame; and
cause the datalink logic to process the second frame as a second client frame, responsive to determining the first frame does not comprise the subsequent frame indicator.

5. The device of claim 4, wherein the first low-power frame comprises the subsequent frame indicator.

6. The device of claim 4, wherein the second frame comprises a non-operational (NOP) frame.

7. The device of claim 6, wherein the NOP frame comprises the subsequent frame indicator.

8. The device of claim 1, the control logic further to:
determine whether the second frame indicates that a third frame is a second low-power frame; and
cause the datalink logic to process the third frame as a second client frame, responsive to determining that the second frame indicates that the third frame is not the second low-power frame.

9. The device of claim 1, further comprising:
transmitter logic coupled to the control logic, to transmit frames over the link; and
second datalink logic coupled to the transmitter logic and the control logic, wherein the control logic is further to:
cause the second datalink logic to generate a second client frame;
cause the transmitter logic to transmit the second client frame over the link;
cause the second datalink logic to generate a second low-power frame using a portion of the second client frame; and
cause the transmitter logic to transmit the second low-power frame over the link.

10. The device of claim 9, wherein to cause the second datalink logic to generate the second low-power frame, the control logic to:

enable a second clock gate for at least a portion of the second datalink logic used to generate the second low-power frame.

11. The device of claim 10, the control logic further to:

cause the second datalink logic to generate a first portion of the second low-power frame;

responsive to generating the first portion of the second low-power frame, cause the second datalink logic to use the portion of the second client frame as a second portion of the second low-power frame by enabling the second clock gate for the second datalink logic;

disable the second clock gate for the second datalink logic; and cause the second datalink logic to generate a third portion of the second low-power frame.

12. The device of claim 9, wherein the second client frame comprises a last portion of client data, wherein the control logic is to:

determine to generate the second low-power frame based on the second client frame comprising the last portion of the client data.

13. The device of claim 9, wherein the control logic is further to:

determine whether a quantity of client data in a data buffer coupled to the control logic exceeds a threshold quantity; and indicate that the second client frame is to include a portion of client data from the data buffer.

14. The device of claim 1, wherein the link is a chip-to-chip (C2C) link or a die-to-die (D2D) link.

15. A system comprising:

a first device coupled to a second device by a link, wherein the first device and the second device each comprise:

receiver logic to sequentially receive a series of frames over the link;

datalink logic coupled to the receiver logic, to process the series of frames; and control logic coupled to the receiver logic and the datalink logic, the control logic to:

determine whether a first frame indicates that a second frame is a first low-power frame, for which the datalink logic consumes less power than a first client frame; and responsive to determining that the first frame indicates that the second frame is the first low-power frame, cause the datalink logic to enable a first clock gate for at least a portion of the datalink logic used to process a first portion of the first low-power frame comprising dummy data, wherein enabling the first clock gate causes the datalink logic to abstain from processing the dummy data in the first portion of the first low-power frame.

16. The system of claim 15, wherein the control logic is further to:

cause the datalink logic to process a second portion of the first low-power frame;

responsive to processing the second portion of the first low-power frame, enable the first clock gate for the datalink logic;

disable the first clock gate for the datalink logic; and cause the datalink logic to process a third portion of the first low-power frame.

17. The system of claim 15, wherein the first device and the second device each further comprise:

transmitter logic to transmit frames over the link; and second datalink logic coupled to the transmitter logic and the control logic, wherein the control logic is further to:

cause the second datalink logic to generate a second client frame;

cause the transmitter logic to transmit the second client frame over the link;

cause the second datalink logic to generate a second low-power frame using a portion of the second client frame; and cause the transmitter logic to transmit the second low-power frame over the link.

18. The system of claim 17, wherein to cause the second datalink logic to generate the second low-power frame, the control logic to:

enable a second clock gate for at least a portion of the second datalink logic used to generate the second low-power frame.

19. The system of claim 18, the control logic further to:

cause the second datalink logic to generate a first portion of the second low-power frame;

responsive to generating the first portion of the second low-power frame, cause the second datalink logic to use the portion of the second client frame as a second portion of the second low-power frame by enabling the second clock gate for the second datalink logic;

disable the second clock gate for the second datalink logic; and cause the second datalink logic to generate a third portion of the second low-power frame.

20. The system of claim 15, wherein the first device and the second device simultaneously transmit and receive frames over the link.

21. A method comprising:

sequentially receiving a series of frames over a link;

determining whether a first frame comprises an indication that a second frame is a low-power frame, for which a datalink layer consumes less power than a second client frame; and responsive to determining that the first frame indicates that the second frame is the low-power frame, enabling a clock gate for at least a portion of logic at the datalink layer used to process a first portion of the low-power frame comprising dummy data, wherein enabling the clock gate causes the logic to abstain from processing the dummy data in the first portion of the low-power frame.

* * * * *